United States Patent
Aust et al.

(10) Patent No.: US 8,532,020 B2
(45) Date of Patent: Sep. 10, 2013

(54) MULTI-HOP COMMUNICATION SETUP SUBJECT TO BOUNDARY VALUES

(75) Inventors: Stefan Aust, Kyoto (JP); Carmelita Görg, Bremen (DE); Cornel Pampu, Berlin (DE); Michael Sessinghaus, Paderborn (DE)

(73) Assignee: Siemens Aktiengesellschaft, Munich (DE)

( * ) Notice: Subject to any disclaimer, the term of this patent is extended or adjusted under 35 U.S.C. 154(b) by 1061 days.

(21) Appl. No.: 11/587,590

(22) PCT Filed: Apr. 28, 2005

(86) PCT No.: PCT/EP2005/051930
§ 371 (c)(1),
(2), (4) Date: Oct. 26, 2006

(87) PCT Pub. No.: WO2005/107306
PCT Pub. Date: Nov. 10, 2005

(65) Prior Publication Data
US 2009/0067366 A1  Mar. 12, 2009

(30) Foreign Application Priority Data
Apr. 30, 2004  (DE) ............ 10 2004 021 319

(51) Int. Cl.
*H04W 84/00* (2009.01)
(52) U.S. Cl.
USPC ............................................... 370/328
(58) Field of Classification Search
USPC ................. 370/328; 455/41.3, 11.1, 7
See application file for complete search history.

(56) References Cited

U.S. PATENT DOCUMENTS

| | | | |
|---|---|---|---|
| 5,764,628 A | 6/1998 | Davis et al. | |
| 6,349,091 B1 * | 2/2002 | Li | 370/238 |
| 6,628,620 B1 * | 9/2003 | Cain | 370/248 |
| 7,184,703 B1 * | 2/2007 | Naden et al. | 455/10 |
| 2003/0125067 A1 * | 7/2003 | Takeda et al. | 455/522 |
| 2003/0134644 A1 * | 7/2003 | Reed et al. | 455/453 |
| 2003/0202469 A1 * | 10/2003 | Cain | 370/230 |
| 2003/0235175 A1 * | 12/2003 | Naghian et al. | 370/338 |
| 2004/0081166 A1 * | 4/2004 | Stanforth et al. | 370/395.32 |
| 2005/0152318 A1 * | 7/2005 | Elbatt et al. | 370/338 |

FOREIGN PATENT DOCUMENTS

| | | |
|---|---|---|
| EP | 0 948 222 A2 | 10/1999 |
| EP | 1 133 113 A2 | 9/2001 |
| EP | 1 289 200 A1 | 3/2003 |

OTHER PUBLICATIONS

Ananthapadmanabha R. et al., "Multi-hop Cellular Networks: The Architecture and Routing Protocols", Department of Computer Science and Engineering, Indian Institute of Technology, In: Personal, Indoor and Mobile Radio Communications, 2001, 12th IEEE International Symposium, ISBN: 0-7803-72244-1, vol. 2, pp. G-78-G-82, Sep./Oct. 2001.

Gabriel Cristache, Klaus David, Matthias Hildebrand, Aspects for the integration of ad-hoc and cellular networks, 3rd Scandinavian Workshop on Wireless Ad-hoc Networks, May 6-7, 2003, pp. 1-5, Stockholm.

M. Lott, M. Weckerle, W. Zirwas, H. Li, E. Schulz, Hierarchical Cellular Multishop Networks, Mar. 2003.

Korean Notice of Allowance for related Korean Patent Application No. 10-2011-7016762, issued on Jun. 29, 2012.

* cited by examiner

*Primary Examiner* — Melody Mehrpour
(74) *Attorney, Agent, or Firm* — Staas & Halsey LLP

(57) ABSTRACT

A method controls the setup of multi-hop communications. For this purpose, boundary values for the multi-hop communications are determined, actual values of the multi-hop communications are detected and multi-hop communications to subscriber terminals are only established if the actual values do not exceed the determined boundary values.

14 Claims, 11 Drawing Sheets

MULTI-HOP COMMUNICATION SETUP SUBJECT TO BOUNDARY VALUES

CROSS REFERENCE TO RELATED APPLICATIONS

This application is based on and hereby claims priority to PCT Application No. PCT/EP2005/051930 filed on Apr. 28, 2005 and German Patent Application No. 10 2004 021 319.4 filed Apr. 30, 2004, the contents of which are hereby incorporated by reference.

BACKGROUND

The present invention relates to a method, a device and a computer program for setting up communication links in a radio communication system comprising at least one base station and user terminals, at least some of which are implemented as multihop capable ad hoc nodes.

M. Lott et al. "Hierarchical Cellular Multihop Networks", EPMCC 2003, March 2003 proposes a combination of a cellular mobile communication system, based on an infrastructure of fixed base stations, and a self-organizing WLAN ad hoc mobile communication system. The base stations provide access to a TCP/IP protocol based backbone network. The WLAN communication system has fixed Internet access points. The range of coverage for establishing communication links between an access point and a WLAN mobile node can be extended by fixed or mobile multihop capable nodes. The publication explains that a multihop communication link requires more network capacity than a direct communication link, as corresponding transmission resources are required for each sub-connection making up the complete multihop link.

G. Cristache et al. "Aspects for the integration of ad-hoc and cellular networks", 3rd Scandinavian Workshop on Wireless Ad-hoc Networks, Stockholm, May 6-7 2003 proposes in particular using an ad hoc network function directly for extending the coverage and increasing the cell capacity of a cellular mobile communication system such as UMTS without providing access points, mobile terminals of the UMTS network being implemented in such a way that a communication link is established from the base station via a mobile terminal to another mobile terminal.

Coverage extension therefore increases the network radius or rather the cell radius so that even terminals farther from a communication network or more precisely from a base station can be supplied by said network or more precisely the relevant base station. However, this has a negative effect on the bandwidth of the network as a whole.

SUMMARY

One possible object of the present invention is to provide an improved way to set up communication links between a base station and user terminals, at least some of which are implemented as multihop capable ad hoc nodes.

The inventors propose a method for establishing communication links in a radio communication system having at least one base station and user terminals, at least some of which are implemented as multihop capable ad hoc nodes. It is provided that, for at least some of the communication links, limit values for multihop communication links are defined on the part of the radio communication system, current values for the multihop communication links are determined, and multihop communication links to user terminals are then only set up if the limit values defined are not exceeded by the current values. This provides a simple way of guaranteeing that specifications are met, particularly in respect of the required bandwidth within the radio communication system. The limit values can be defined once or at regular intervals. However, they can also be dynamically defined and optimized on an event-controlled basis, e.g. if there is a change in the current number of active user terminals in the particular radio communication system.

It can preferably be provided that individual limit values can be set for each base station, thereby enabling the limit values to be individually optimized for each base station depending on the local conditions in the region of the particular base station.

The limit values can basically be defined in any suitable manner and by any suitable entity of the radio communication system. Preferably, however, cell parameters are analyzed by a base station of the radio communication system and the limit values for the communication links of said base station are defined on the basis of the result of said analysis, thereby enabling the limit values to be defined autonomously and individually by each base station.

It can additionally be provided that information about the limit values set for the relevant base stations can be exchanged between base stations of the radio communication system, thereby enabling the limit values of the base stations to be optimized by mutual coordination among the base stations in order to achieve optimum possible network operation also across base stations. This further development also provides the possibility of adjusting the limit values of a base station on the basis of the defined limit values of adjacent base stations.

In particular it can be provided that the exchange of information is based at least in part on an IPv6 protocol. The advantage of protocols according to IPv6 (IP Protocol Version 6) is that even functionalities for communication links from and/or to mobile user terminals are provided within the framework of said protocols, it being preferably provided that the exchange of information is based at least in part on a protocol according to HMIPv6 (Hierarchical Mobility IPv6). This protocol constitutes an extension of IPv6 permitting a scalable IP network infrastructure including individual mobility anchor points (MAPs), thereby providing particular advantages which also impact precisely the communications side of the communication links to user terminals: using the MAPs, an IP infrastructure with virtually any hierarchical levels can be formed, i.e. the IP infrastructure is scalable virtually at will depending on requirements in terms of network coverage and access nodes to the IP infrastructure. In this way, necessary handovers in particular can be effected more quickly on the radio network side, as in terms of signaling a handover only needs to be handled via the locally affected MAPs and not, for example, via a single common central device which would slow down the handover process.

The limit values can basically be defined on the basis of any suitable specifications and/or measurement data. However, it is preferably provided that the limit values are set on the basis of ad hoc protocol data. To set the limit values, data present anyway as part of the setting up or more precisely the signaling of ad hoc communication links is therefore used, thereby enabling the method to be implemented with minimal additional cost/complexity on the part of the radio communication system.

The inventors also propose a device for setting up communication links in a radio communication system comprising at least one base station and user terminals, at least some of which are implemented as multihop capable ad hoc nodes. The device may have the following:

a unit for setting limit values for multihop communication links at least for some of the communication links, a unit for comparing the defined limit values with current values for the multihop communication links, and a unit for establishing further multihop communication links according to the result of the comparison. The advantages resulting from these technical measures have already been explained in analogous manner with reference to the method explained above.

A development of this subject matter features a unit for exchanging limit value information between base stations of the radio communication system. Once again, for the significance and the advantages of this measure, reference is made to the corresponding explanations in connection with the method described above.

In particular it can be provided that the unit for exchanging information is designed at least in part to process an IPv6 protocol, it being preferably provided that the unit for exchanging information is designed at least in part to process an HMIPv6 protocol. The resulting advantages specifically for a radio communication system with mobile, multihop capable user terminals have already been explained above with reference to the method.

The inventors further propose a computer program which is preferably designed to carry out a method described above. In particular, the computer program can be designed to operate in conjunction with the device described above.

The computer program may have the following:

a first program routine which calculates and sets limit values for multihop communication links for at least some of the communication links in a radio communication system, a second program routine for determining current values for the multihop communication links and a third program routine which activates a device for establishing multihop communication links to user terminals provided that the limit values defined are not exceeded by the current values.

The other abovementioned method, data processing and transmission steps and particularly protocols which are explained in the context of the following descriptions of the figures can basically also be implemented in the form of program routines of this or another suitable computer program.

BRIEF DESCRIPTION OF THE DRAWINGS

These and other objects and advantages will become more apparent and more readily appreciated from the following description of the preferred embodiments, taken in conjunction with the accompanying drawings of which.

DETAILED DESCRIPTION OF THE PREFERRED EMBODIMENT

Figure 1:
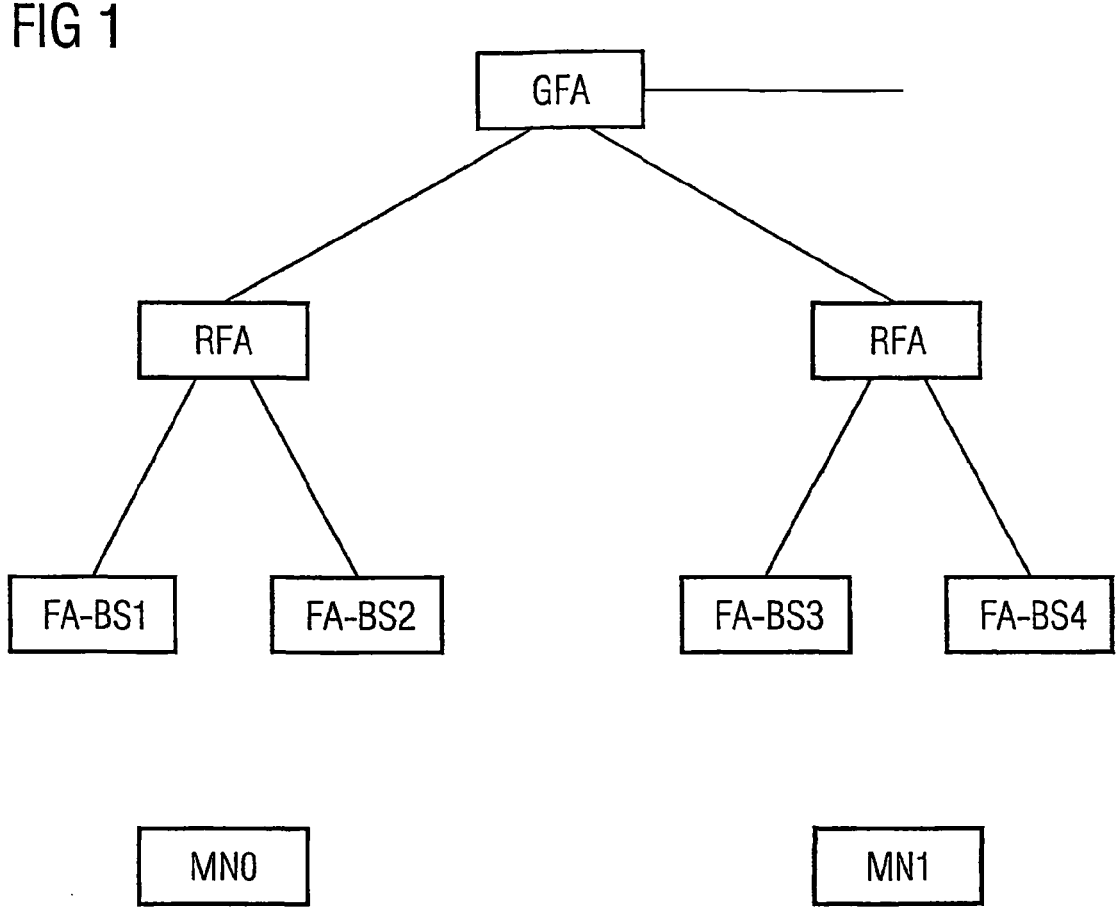
FIG. 1: schematically illustrates a hierarchical communications infrastructure

Reference will now be made in detail to the preferred embodiments, examples of which are illustrated in the accompanying drawings, wherein like reference numerals refer to like elements throughout.

The example described below relates to a possibility for setting limit values for multihop communication links, wherein a hop radius (maximum permissible number of hops per communication link) and/or the total number of user terminals in the ad hoc network that are currently connected to a base station are defined. The user terminals of the wireless communication network are able, on the basis of the multihop capability of at least some of the user terminals, to establish a connection to the base station via an ad hoc network, even though said user terminals are outside the range of the base station. The ad hoc network consequently extends the range of the base station by a multihop ad hoc routing protocol. This coverage extension is based on the use of user terminals in the form of ad hoc nodes acting as routers to provide IP connections which can be used for the communication pathway of the relevant communication link. The wireless communication network can be implemented e.g. as a suitable UMTS mobile network or even as a WLAN network which permits a corresponding ad hoc coverage extension, as is basically known.

Figure 11:
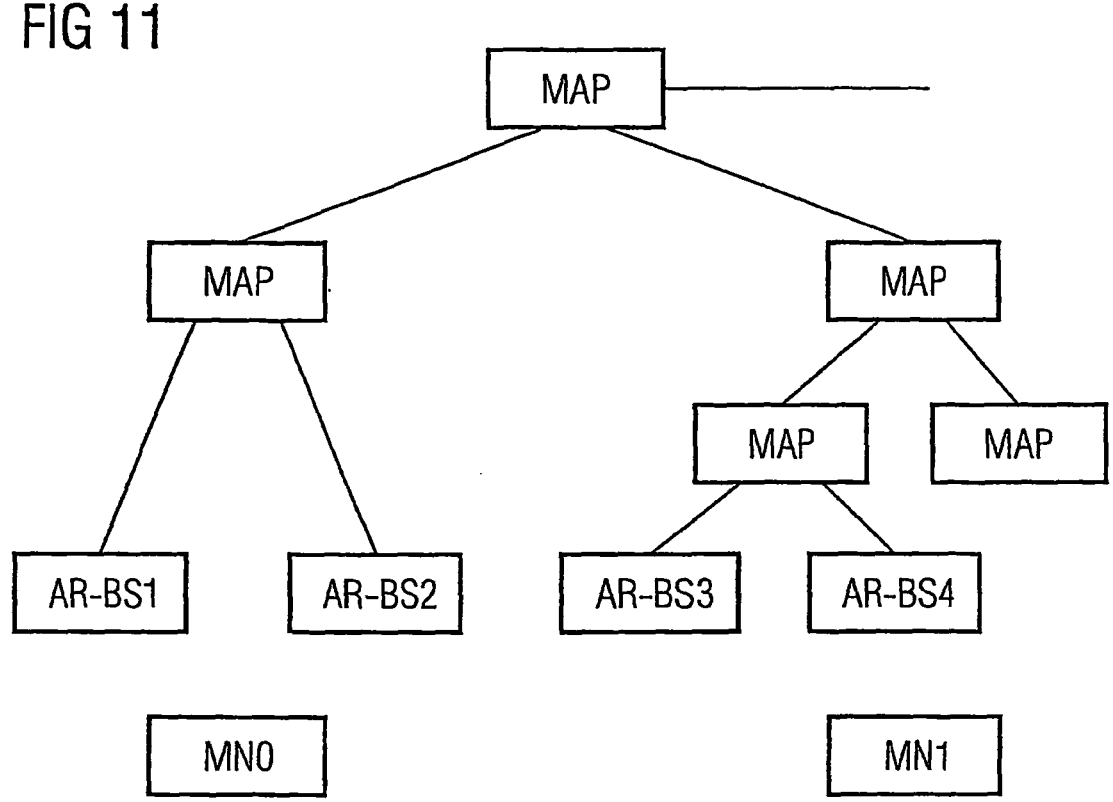
FIG. 11: schematically illustrates a hierarchical communications infrastructure as per FIG. 1, but according to HMIPv6

The components and functions of the subject matter will now be briefly explained according to the present embodiment:

Base Station:

The base station is the gateway between the ad hoc user terminals and an IP infrastructure (e.g. Internet, see FIGS. 1 and 11). It provides the ad hoc user terminals with access to the Internet and therefore allows ad hoc user terminals to be connected to distant communication partners which are likewise connected to an IP-based communications infrastructure. The base station is accordingly designed for connecting ad hoc user terminals to the Internet and is therefore designed for processing an ad hoc protocol as well as an IP-based mobility protocol.

Hop Radius:

The hop radius corresponds to the maximum permissible hop length from the base station to the ad hoc users in the ad hoc network. The hop radius is therefore the maximum permissible number of hops (intermediate nodes) between the base station and an ad hoc user terminal. The number of hops is communicated to the base station using the ad hoc protocol, or more precisely can be ascertained by the base station from the routing information. For example, if such a connection has three hops, the base station, an ad hoc user terminal and two further ad hoc nodes are contained in said connection. If the maximum permissible hop count is increased, i.e. the hop radius is extended, the network load increases, as even more ad hoc users may therefore be included in the ad hoc network around the base station. A hop radius can be set by the base station itself. On the basis of the radius defined, ad hoc user terminals whose hop length would exceed the hop radius are not accepted into the ad hoc network around the corresponding base station, which means that the network and the network load remain stable.

Ad Hoc User Count:

Alternatively or additionally to the abovementioned method, the absolute number of ad hoc user terminals within an ad hoc network can be taken into account for calculating the network load and setting the hop radius. As an alternative to setting a hop radius as the limit value, a maximum number of ad hoc user terminals can also be defined as the limit value within an ad hoc network, it being possible to stipulate, for example, that the hop radius for a particular base station shall not be reduced as long as a particular number of ad hoc user terminals is not exceeded.

A trade-off between hop radius and maximum permissible ad hoc user count can also be implemented (hybrid method):

The abovementioned methods for setting the hop radius and the maximum permissible number of ad hoc user terminals can be combined for optimized calculation of the network load, a trade-off being possible which allows improved network planning as a trade-off between a hop radius algorithm and ad hoc user count algorithm. Corresponding assessment parameters are preferably calculated here on the basis of said algorithms. This calculation can be performed autonomously by the base station and used for setting both the hop radius and the maximum permissible number of ad hoc users. A virtual coverage radius can preferably also be defined as a further limit value for this method. Said virtual coverage radius constitutes a value which is determined as a function of the defined and/or determined values for the hop radius and the maximum permissible number of ad hoc users. The greater the hop radius and the higher the ad hoc user count, the greater the coverage radius also. In the simplest case, the coverage radius is directly proportional to the hop radius and to the ad hoc user count.

Communication Between the Base Stations:

A specific communication protocol is used for data exchange between different base stations FA-BS1 to FA-BS4 (see FIG. 1). Said communication protocol provides for the exchange of limit value information, such as the hop radius or the maximum permissible number of ad hoc users, between (preferably adjacent) base stations FA-BS1 to FA-BS4. The information can be exchanged e.g. via an IP infrastructure schematically illustrated in FIG. 1 to which the base stations FA-BS1 to FA-BS4 are connected. For this purpose a hierarchical mobile IP infrastructure can be provided which allows higher-order entities (mobility agents) to coordinate the exchange of information between the base stations FA-BS1 to FA-BS4. In the example shown in FIG. 1 these are implemented as regional foreign agent RFA and/or gateway foreign agent GFA. FIG. 11 shows an alternative embodiment based on IPv6. The IP structure according to HMIPv6 is illustrated, only mobility anchor points (MAP) that are in principle functionally equivalent being provided instead of the strictly defined RFA and GFA. The base stations BS1 to BS4 are used as access routers AR, which means that the IP infrastructure is scalable virtually as required. This will be explained in greater detail below.

The mobility agents RFA, GFA as shown in FIG. 1 are connected to the base stations FA-BS1 to FA-BS4 at data link level, making it easy for data to be exchanged between the different base stations FA-BS1 to FA-BS4. The abovementioned protocol permits this data exchange as part of the autonomous adaptation and optimization of network planning, based on the hop radius and/or the maximum permissible ad hoc user count.

With the method, limit values are set for an ad hoc network around a base station, thereby also finally setting the extent of the coverage extension around the corresponding base station. In general, smaller hop radii or lower ad hoc user counts necessarily also result in a smaller enlargement of the coverage extension attained by the ad hoc network around a corresponding base station. This fact can be taken into account in the context of defining the abovementioned virtual coverage radius.

The setting of limit values is necessary in order to prevent long IP routes being set up by far distant ad hoc user terminals MN0, MN1 over a large number of hops which would in turn reduce the bandwidth of the overall ad hoc network around a base station FA-BS1 to FA-BS4. This will now be illustrated even more clearly with reference to FIGS. 2 to 4. By setting limit values, a base station FA-BS1 to FA-BS4 can therefore ultimately be influenced as to whether a distant user terminal MN0, MN1 is to be accepted into its own ad hoc network. This requires an algorithm which defines a criterion from the existing number of ad hoc users and the hop lengths so that the bandwidth can be maintained.

Moreover, each base station FA-BS1 to FA-BS4 can decide, on the basis of the limit values set and the exchange of information with other base stations FA-BS1 to FA-BS4 and/or with a particular ad hoc user terminal MN0, whether said ad hoc user terminal MN0 is to be accepted into its own ad hoc network, particularly if said ad hoc user terminal MN0 cannot determine for itself any other possible connection to other base stations FA-BS1 to FA-BS4. In this case the user terminal MN0 can send a corresponding request to the only reachable base station FA-BS1 to FA-BS4. This is particularly the case when only one base station FA-BS1 is present, or the base stations FA-BS2 to FA-BS4 adjacent to a first base station FA-BS1 are so defined that they cannot change the hop radius set for them such that said user terminal MN0 can be accepted into their ad hoc network.

As already explained, it is preferably provided that the base stations FA-BS1 to FA-BS4 exchange the information concerning a provisionally set hop radius among one another. This information exchange can take place as broadcast/multicast and can consequently use the existing IP-based infrastructure shown in FIG. 1. On the basis of the received information of adjacent base stations FA-BS1 to FA-BS4, each of the base stations FA-BS1 to FA-BS4 can vary the provisional hop radius in one or more iterative optimization steps such that as large a plurality of ad hoc user terminals MN0, MN1 as possible can be supplied, where necessary taking minimum values for the bandwidth of each of the ad hoc networks into account. This optimization can also be carried out dynamically, e.g. in the event that the network load of a particular base station FA-BS1 increases and the hop radius of said base station FA-BS1 must therefore be reduced. As part of said optimization process it can be determined whether and to what extent other base stations FA-BS2 to FA-BS4 can extend their respective hop radius, thereby allowing area-wide data supply of the ad hoc user terminals MN0, MN1 so that each ad hoc user terminal MN0, MN1 can establish a data connection to a base station FA-BS1 to FA-BS4. This will be explained more clearly below with reference to FIGS. 3 and 4.

In addition, within the ad hoc protocol, signaling can be provided between base stations FA-BS1 to FA-BS4 and ad hoc user terminals MN0, MN1 and likewise further signaling can be provided within the IP protocol between different, preferably adjacent base stations FA-BS1 to FA-BS4, permitting a particular base station FA-BS1 to reject, or another base station FA-BS2 to FA-BS4 to assign, an additional ad hoc user terminal MN1.

As already explained, each ad hoc user terminal MN0, MN1 wishing to communicate with the Internet requires a base station FA-BS1 to FA-BS4 as a default gateway so that the routing requests are forwarded to the Internet. For this purpose an IP-based mobility protocol is used which can forward the requests and responses to the relevant base station FA-BS1 to FA-BS4. In addition, by using a mobility protocol of this kind (e.g. mobile IP/HMIP/FMIP), the global mobility of any ad hoc user terminal MN0, MN1 can be supported. This allows roaming between disjoint ad hoc networks of different base stations FA-BS1 to FA-BS4 and also between different IP infrastructures at any time, without disturbing existing IP connections.

A plurality of base stations may be disposed in a distributed manner, it being possible to increase the coverage of the base stations by using multihop capable terminals and ad hoc routing protocols, whereby the range of the base station (coverage extension radius) generally expands with the number of connected ad hoc nodes. Measurements show that this expansion has a negative effect on data throughput. By limiting the hop length, i.e. defining the hop radius and/or limiting the number of permissible ad hoc nodes, the network load can be optimized. The data rate and network load can be independently controlled on the part of the base stations in such a way that the actual network load does not exceed a predefined maximum network load, thereby enabling the required data rate to be maintained for each ad hoc user terminal for ad hoc data connections via the respective base station.

According to the related art, an ad hoc multihop protocol currently makes no provision for a maximum permissible hop length or more precisely a defined hop radius for connecting ad hoc user terminals to existing ad hoc networks. Rather, according to the related art it is generally the case that all users are accepted into an existing hoc network, irrespective of the number of hops. Moreover, no autonomous agreement among the base stations concerning limit values and where necessary their optimization is currently provided in the protocols according to the related art.

The above described method will now be explained in detail.

1. Method for determining the hop length and setting the hop radius:
   a) Definition of an optimum network load by the base station
   b) Determination of the actual network load by the base station
   c) Comparison of the optimum network load with the maximum permissible network load by the base station
   d) Setting of a hop radius on the basis of the results from step c)
   e) Transmission of information concerning the hop radius set to adjacent base stations via the abovementioned protocol
   f) Autonomous adjustment of the hop radius by the base station on the basis of information received concerning the hop radii of adjacent base stations 2. Method for determining the maximum number of ad hoc users (node count):
   a) Definition of an optimum node count by the base station
   b) Determination of the actual node count by the base station
   c) Comparison of the optimum node count with the maximum permissible node count by the base station
   d) Setting of a maximum permissible node count
   e) Transmission of information concerning the node count set to adjacent base stations via the abovementioned protocol
   f) Autonomous adjustment of the node count by the base station on the basis of information received concerning the node count of adjacent base stations 3. Method for the combined setting of the hop length and ad hoc user count (hybrid method):
   a) Defining of the optimum network load, relating to an optimum ad hoc node count and hop radius, by the base station
   b) Determination by the base station of the actual network load, relating to the actual number of ad hoc nodes and the actual hop radius
   c) Comparison of the actual network load with the optimum network load by the base station
   d) Setting of the hop radius and maximum permissible node count
   e) Transmission of information concerning the hop radius and node count set to adjacent base stations via the abovementioned protocol
   f) Autonomous adjustment of the hop radius and node count by the base station on the basis of information received concerning the hop radius and node count of adjacent base stations A possible implementation of the method for determining the hop radius will now be described by way of example:

An algorithm is used which evaluates the load and status of a base station in conjunction with the connected ad hoc network. This evaluation forms the basis for determining the hop density and hop length. The density is calculated from the number of ad hoc user terminals divided by the hop radius. Individual results from the ad hoc density calculation which are determined at different points in time can also be averaged and used for a comparison. If the hop count increases, an increasing network density must also be assumed. An increase in the network density will in turn increase the network load. This in turn results in the minimizing of the data rate of all the ad hoc user terminals. To ensure that the base station can maintain the determined data rate for all the ad hoc user terminals, the network must be limited. This can be determined by active measurement or by comparison values, thereby enabling the optimum network density to be defined. The values required for this purpose are known to the relevant base station.

When an ad hoc network is set up, the base station can compare the current network density, obtained on the basis of the currently determined number of ad hoc user terminals, with stored and/or averaged setpoint values and define the hop radius autonomously. By the independent comparison on the part of the base station between the setpoint value of the network density and the actual value of the density of the ad hoc nodes present, the base station can determine the hop radius and use it to decide whether a new ad hoc user terminal is to be admitted. Ad hoc user terminals with a hop length that is less than or equal to the hop radius can be accepted into the ad hoc network by the base station. However, this increases the network load. Any exceeding of the setpoint value or maximum value of the network load can be prevented by the above described comparison of the current ad hoc user count with the defined maximum permissible number of ad hoc user terminals and, where necessary, by rejecting the new user terminal, or by re-calculating the current network load and if necessary reducing the hop radius.

The criterion for an ad hoc node, to set up a route to a particular destination node, currently depends on a hop metric which is based on selecting the shortest path and using it as the communication path. Consequently an ad hoc node will generally opt for a base station providing the shortest path. However, this is impermissible if the selected path length exceeds the hop radius of the ad hoc network of the corresponding base station.

FIG. 1 schematically illustrates the layout of a hierarchical communications infrastructure. Four base stations FA-BS1 to FA-BS4 are shown by way of example in FIG. 1. According to the IP protocol represented in FIG. 1, these four base stations FA-BS1 to FA-BS4 are implemented as foreign agents which are interconnected at least regionally via regional foreign agents RFA. In the case of IPv6, as shown in FIG. 11, this layout corresponds to a structure comprising mobility anchor points (MAP) which perform local registration of the ad hoc user terminals. FIG. 1 additionally shows two mobile ad hoc nodes MN0, MN1 which move freely between the four base stations FA-BS1 to FA-BS4.

Figure 2:
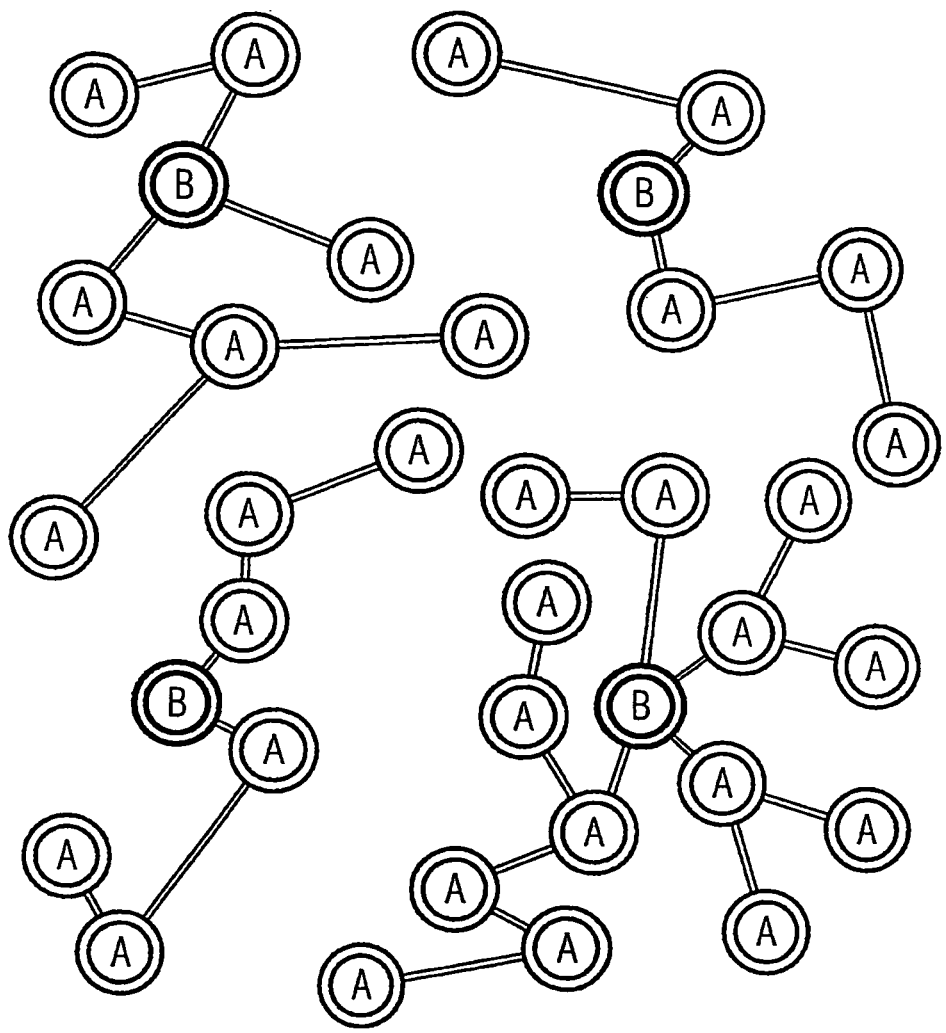
FIG. 2: schematically illustrates an ad hoc coverage extension without defined hop radius

FIG. 2 shows an ad hoc network structure comprising four ad hoc networks each having ad hoc user terminals A and a base station B. No limit value has been defined for the hop length between the base stations B and the ad hoc user terminals A. This results in an undefined network structure around each of the base stations B and an asymmetrical network load distribution among or around the individual base stations B which takes absolutely no account of the maximum data transmission capacity of the base stations B.

Figure 3:
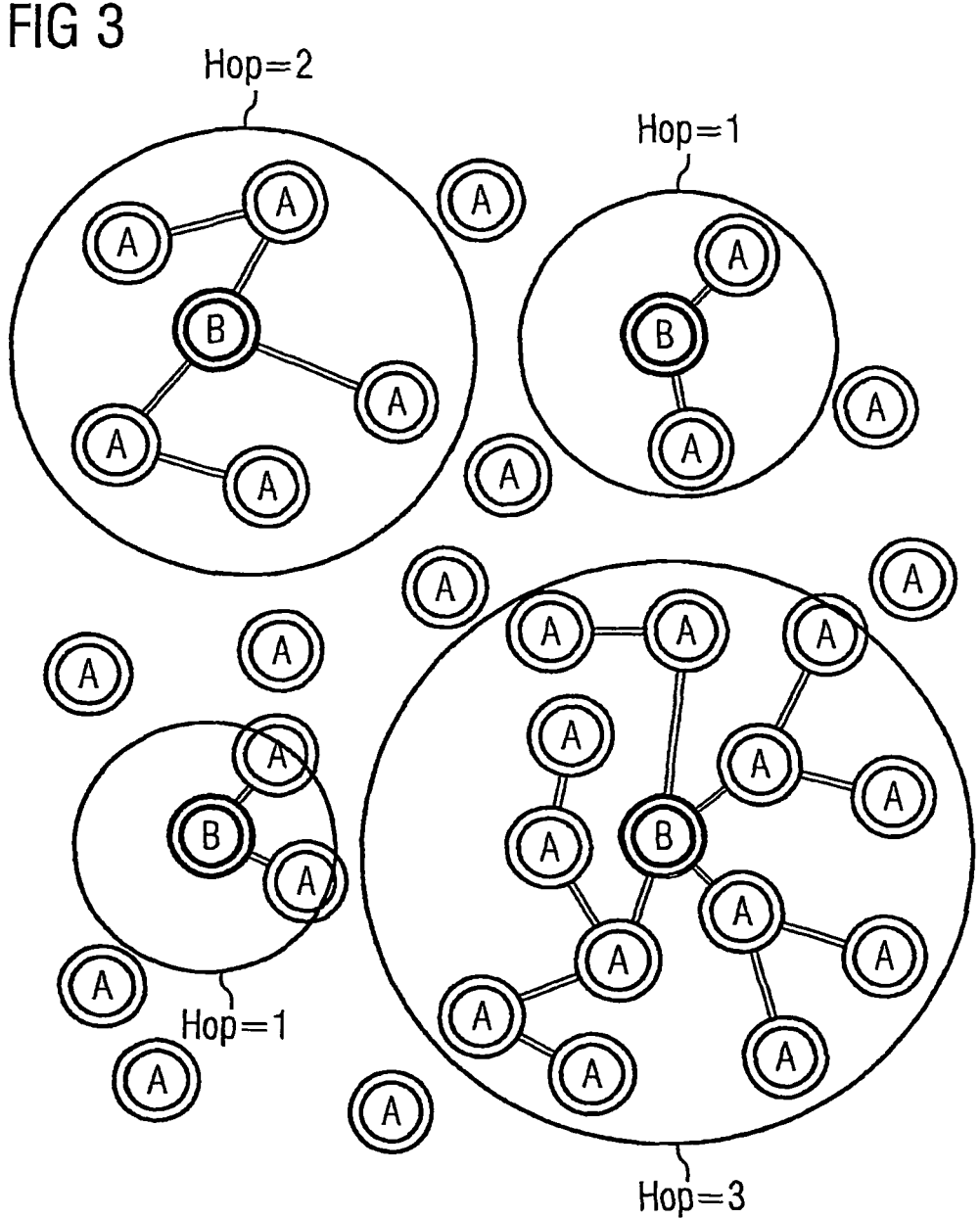
FIG. 3: schematically illustrates an ad hoc coverage extension with defined hop radii

FIG. 3 shows a situation according to FIG. 2 but in which in order to implement the ad hoc coverage for each base station B a defined hop radius, i.e. a maximum permissible number of hops (hop=1, 1, 2, 3), has been set. By determining the network load and taking into account the capability or more specifically the transmission capacity of the particular base station (i.e. the maximum theoretically possible network load, the capacity of the connection to the IP backbone also being critical here), an individually optimum hop radius can be set by each base station. However, FIG. 3 shows that if only a hop radius individually set by a base station B is set, the situation may arise that particular ad hoc user terminals are not supplied by a base station B.

Figure 4:
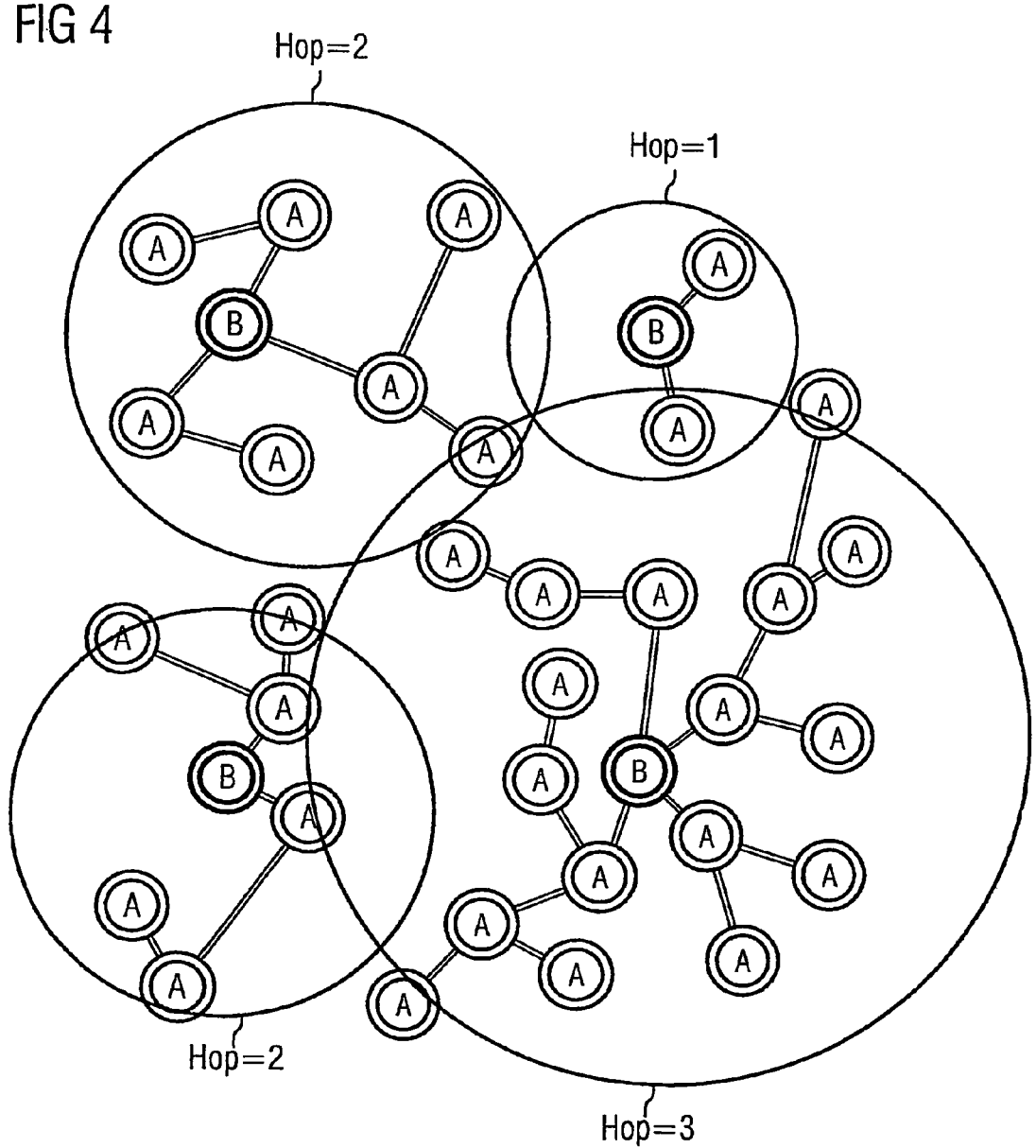
FIG. 4: schematically illustrates an ad hoc coverage extension with optimized hop radius

FIG. 4 shows the situation according to FIG. 3 after the individually set hop radius of the base stations B has been further optimized regionally and/or globally in one or more iterative optimization steps by an agreement between the base stations B such that all the ad hoc user terminals A can be supplied, resulting in hop radii (hop=1, 2, 2, 3). A dynamic network load distribution is also possible here which, while allowing preferably each base station B to manage only as many ad hoc user terminals as it can accommodate on the basis of its own capability, nevertheless allows all the user terminals A to be supplied. This means that any increase in network load above the capacity of each base station B can be avoided while nevertheless ensuring area-wide coverage.

Figure 5:
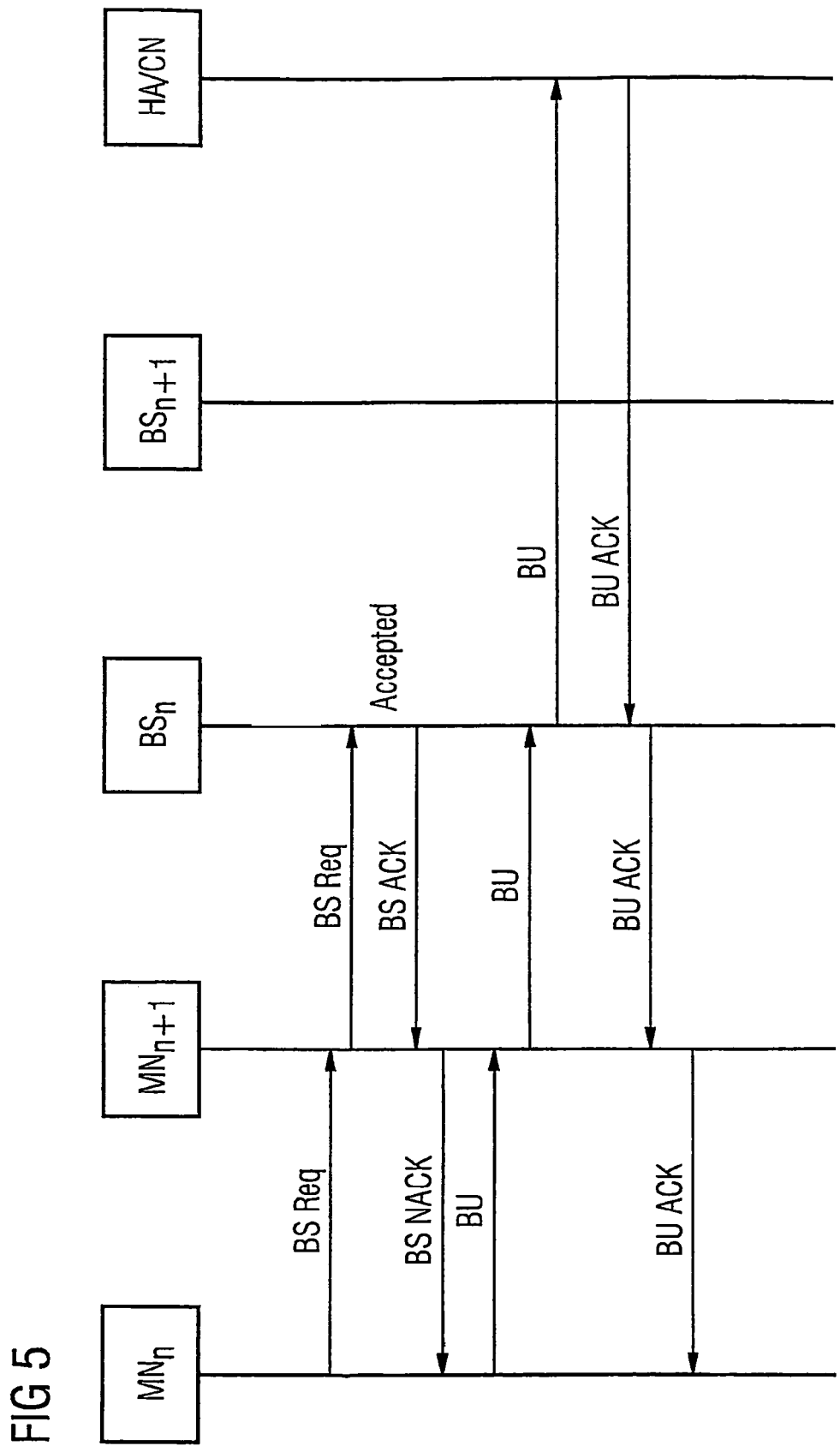
FIG. 5: shows the sequences in the event of a positive comparison result of the hop radius without communication between the base stations

FIG. 5 shows the sequences of the proposed protocol when the user terminal MN(n) attempts to take up a connection to the base station BS(n) in order to obtain access to the Internet via said base station as the default gateway. For this purpose MN(n) sends a base station request BS Req via a multihop capable terminal MN(n+1) which is already part of the ad hoc network of the base station BS(n), whereupon BS(n) compares the hop length with the defined hop radius. As this is met, BS(n) accepts the user terminal MN(n). The latter then initiates the registration process with the home agent (HA) or with the correspondent node (CN) and sends a binding update BU. This is confirmed by the home agent (BU ACK). At this point in time the connection is completely established. User terminal MN(n) is now connected to an IP-based infrastructure (e.g. the Internet).

Figure 6:
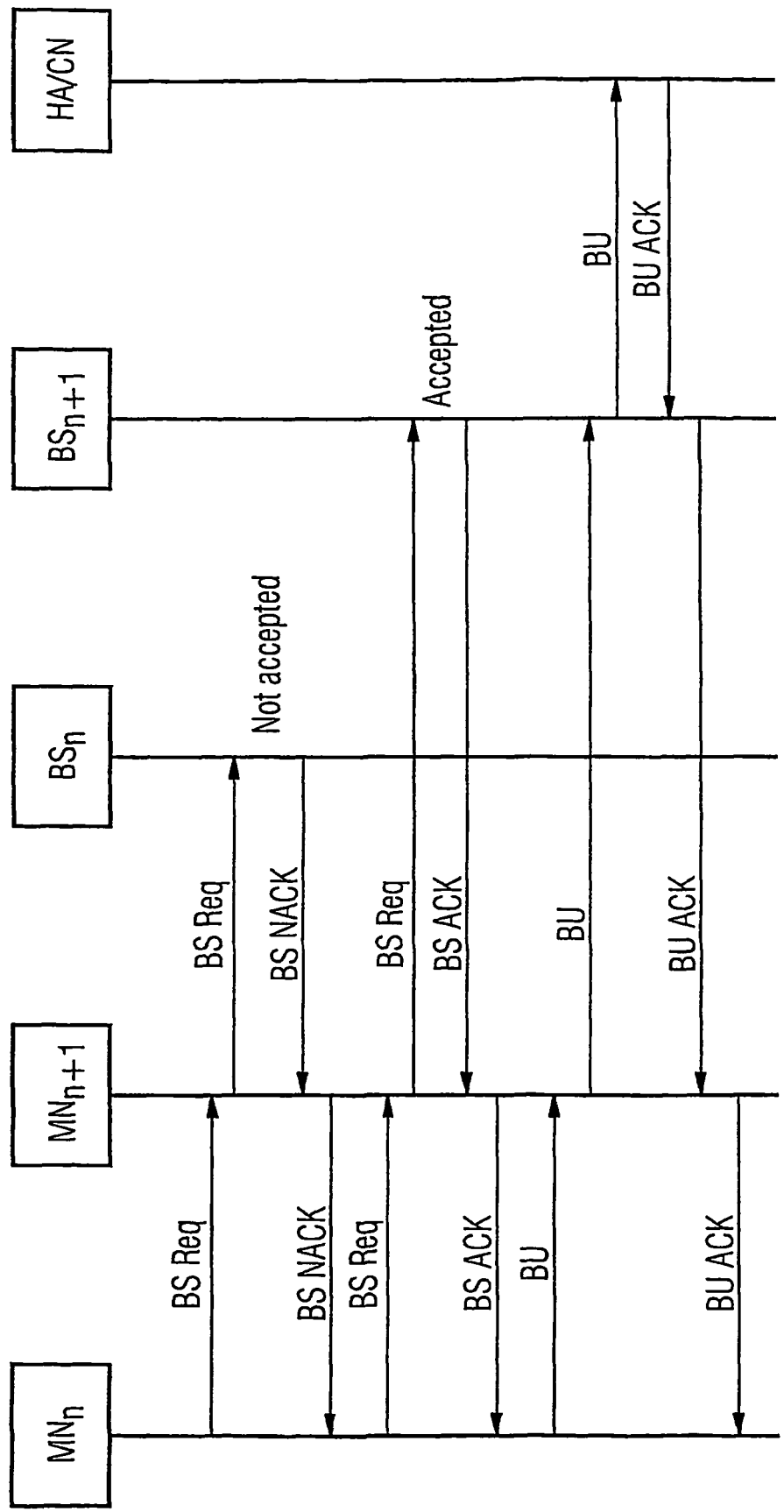
FIG. 6: shows the sequences in the event of a negative comparison result of the hop radius without communication between the base stations

Analogously to FIG. 5, FIG. 6 shows the sequences of the proposed protocol when the user terminal MN(n) attempts to take up a connection to the base station BS(n) in order to obtain access to the Internet via said base station as the default gateway. For this purpose MN(n) sends a base station request BS Req via a multihop capable terminal MN(n+1) which is already part of the ad hoc network of the base station BS(n), whereupon BS(n) compares the hop length with the defined hop radius. As a result, however, the base station BS(n) in this case ascertains that this is not met. BS(n) therefore sends a negative acknowledgement BS NACK.

User terminal MN(n) now starts with a new base station request BS Req. Another base station BS(n+1) then answers. The latter could also have already responded to the first request. However, the user terminal MN(n) has no knowledge as to which BS is able to accept it. The first BS will not therefore reply to the second request (storing of the request can preferably be provided). After comparison of the hop length with the hop radius, BS(n+1) is ready to accept the new node MN(n), and sends a positive acknowledgement BS ACK.

Thereafter user terminal MN(n) begins sending the binding update (BU) to the home agent (HA). The connection is completely established.

Figure 7:
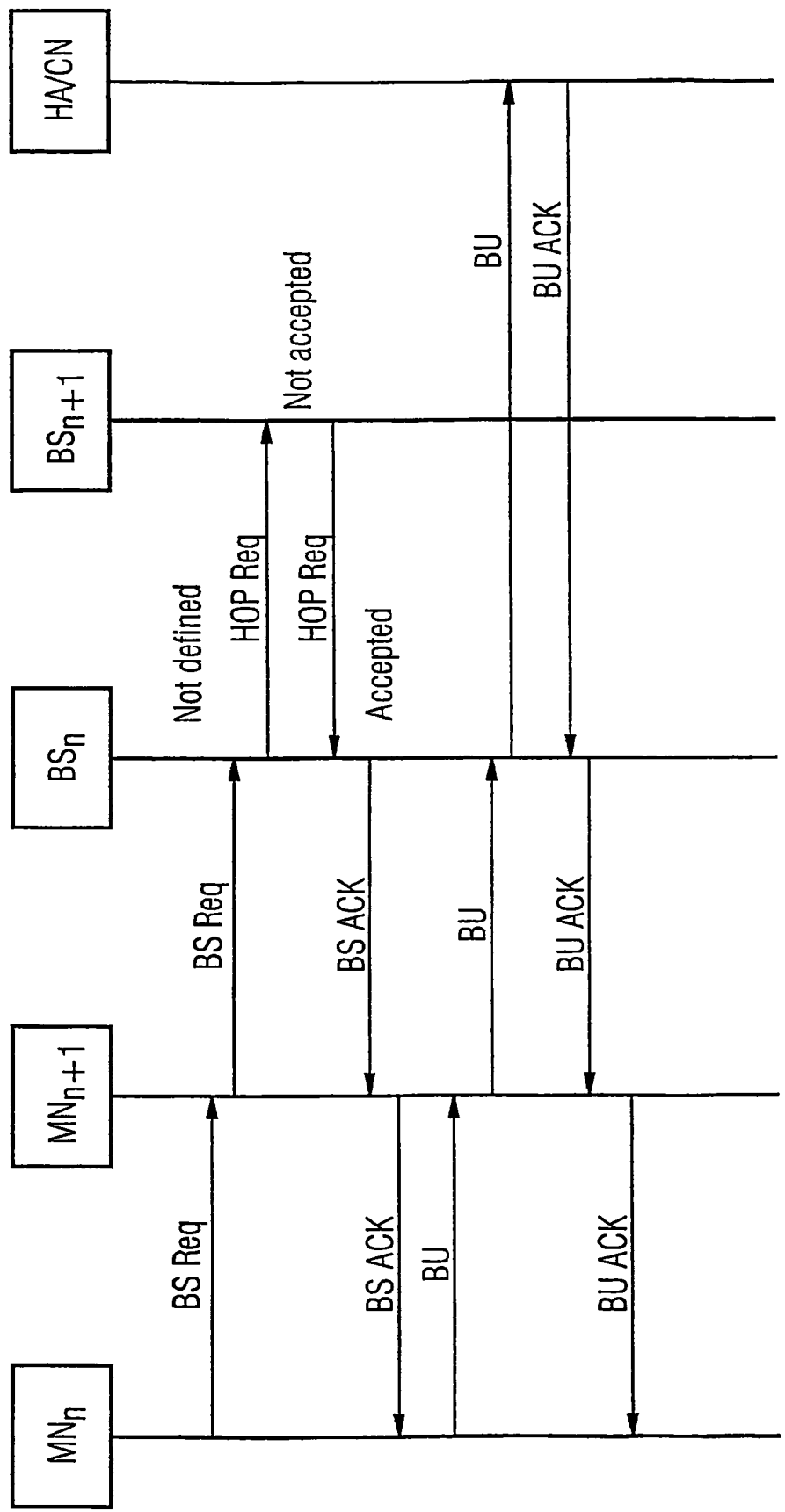
FIG. 7: shows the sequences in the event of a positive comparison result of the hop radius with communication between the base stations

FIG. 7 shows the sequences when the user terminal MN(n) attempts to log onto base station BS(n). For this purpose MN(n) again sends a request via a multihop capable terminal MN(n+1) which is already part of the ad hoc network of the base station BS(n). The base station BS(n) compares the hop length with a defined hop radius. The result of the comparison is that the user MN(n) would have to be rejected. Before the base station BS(n) rejects the new user MN(n), the base station BS(n) begins interrogating adjacent base stations BS(n+1) in order to ascertain their hop radius. For this purpose BS(n) sends a HOP request (HOP Req). The reply of the adjacent base station BS(n+1) produces the result that BS(n) must nevertheless accept the new user MN(n). The connection is the completely established. This may be due to the fact that the other BS(n+1) has reached its capacity limit, which may be indicated by a low hop radius. BS(n) possesses the highest hop radius and can increase it so that the new user terminal MN(n) can be accepted. Should BS(n) not be able to increase the hop radius, as the capacity limit has been reached, the new user terminal MN(n) will not be accepted. The latter can or must now change, for example, to a higher-order network, e.g. a cellular mobile network, by a vertical handoff.

Figure 8:
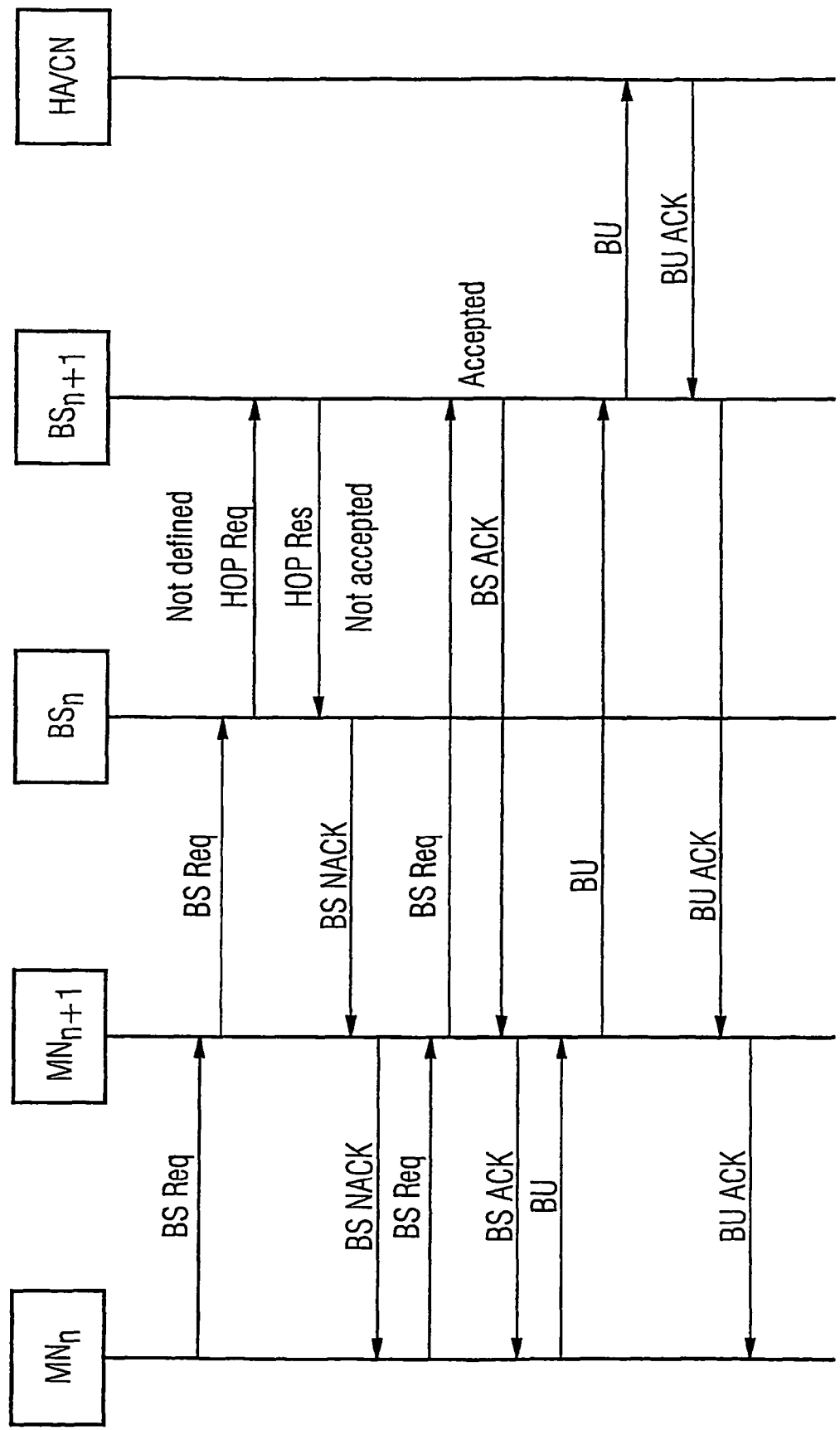
FIG. 8: shows the sequences in the event of a negative comparison result of the hop radius with communication between the base stations

FIG. 8 shows the sequences for the attempt of the user terminals MN(n) to log onto the base station BS(n) via a multihop capable terminal MN(n+1). The base station BS(n) compares the hop length with a defined hop radius. The result of the comparison is that the user MN(n) would have to be rejected. Before the base station BS(n) rejects the new user MN(n), the base station BS(n) begins to interrogate the adjacent base station BS(n+1) in order to ascertain its hop radius. For this purpose BS(n) sends a HOP request HOP Req. The reply of the adjacent base station BS(n+1) produces the result that BS(n) does not need to accept the new user MN(n). BS(s) therefore sends a BS NACK, whereupon MN(n) sends a BS Req in order to seek out another base station. BS(n+1), which posses a higher hop radius, responds. Said base station BS(n+1) compares the request with its hop radius and accepts the new user MN(n). The latter then sends the binding update (BU) to the home agent (HA). The connection is completely established.

Figure 9:
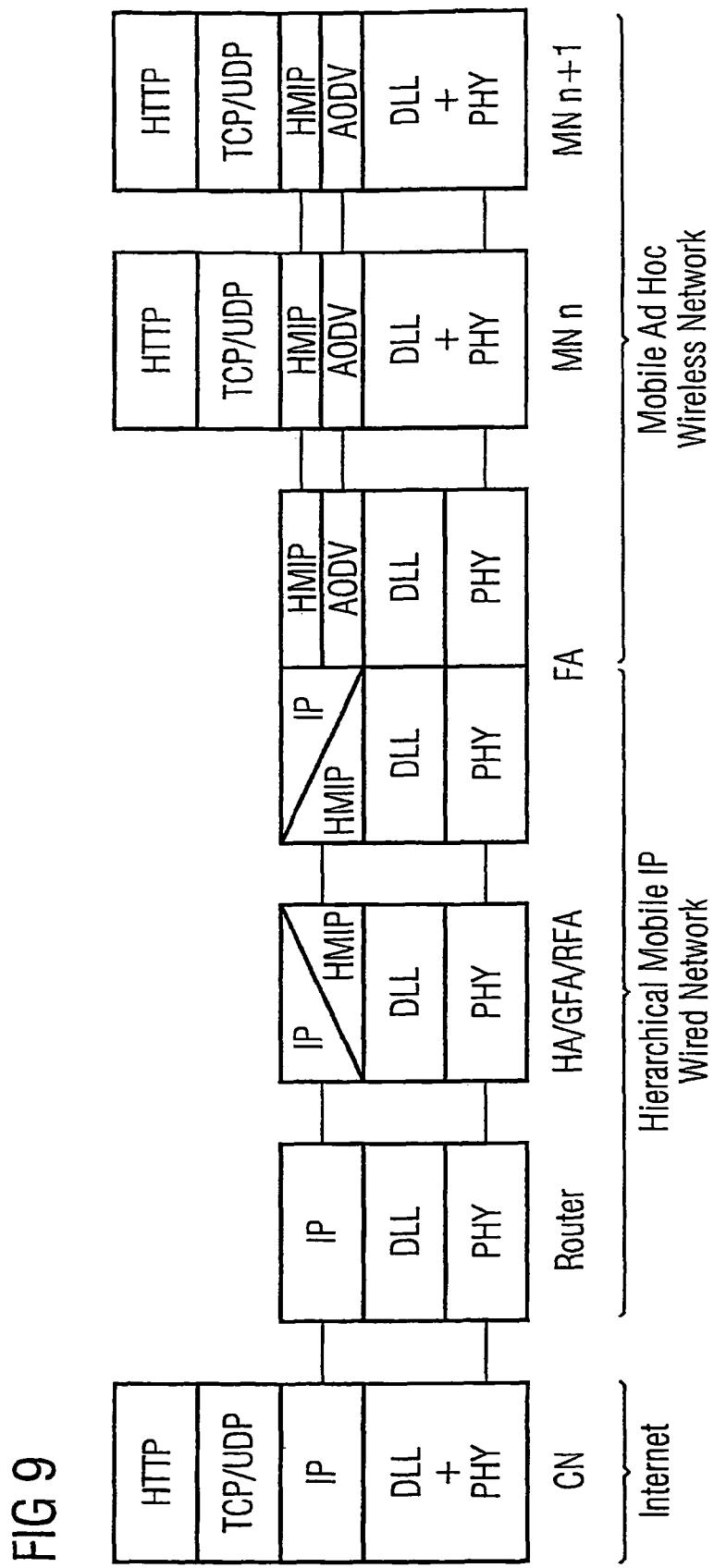
FIG. 9: shows the protocol stack for connecting mobile IP and ad hoc (AODV)

FIG. 9 shows the protocol stack for the integration of mobile IP and AODV (ad hoc on-demand distance vector routing protocol) which has been used for the protocol described here by way of example. The following mobility agents are shown: correspondent node (CN), home agent (HA), gateway foreign agent (GFA), regional foreign agent (RFA) and foreign agent (FA). In addition, the connection of an ad hoc network comprising MN(n) and MN(n+1) is shown.

The ad hoc routing protocol (here AODV) is used for the connection and transmission of IP routing packets. The HMIP protocol stack is used for connecting mobile user terminals to the Internet when these change between the IP networks. For this purpose the ad hoc user terminals send the binding update (BU) via the base station, said base station being the FA constituting the gateway between the ad hoc network and the IP infrastructure.

The protocol is implemented for HMIPv6, only mobility anchor points MAP according to FIG. 11 are provided instead of gateway foreign agent (GFA) and regional foreign agent (RFA).

Figure 10:
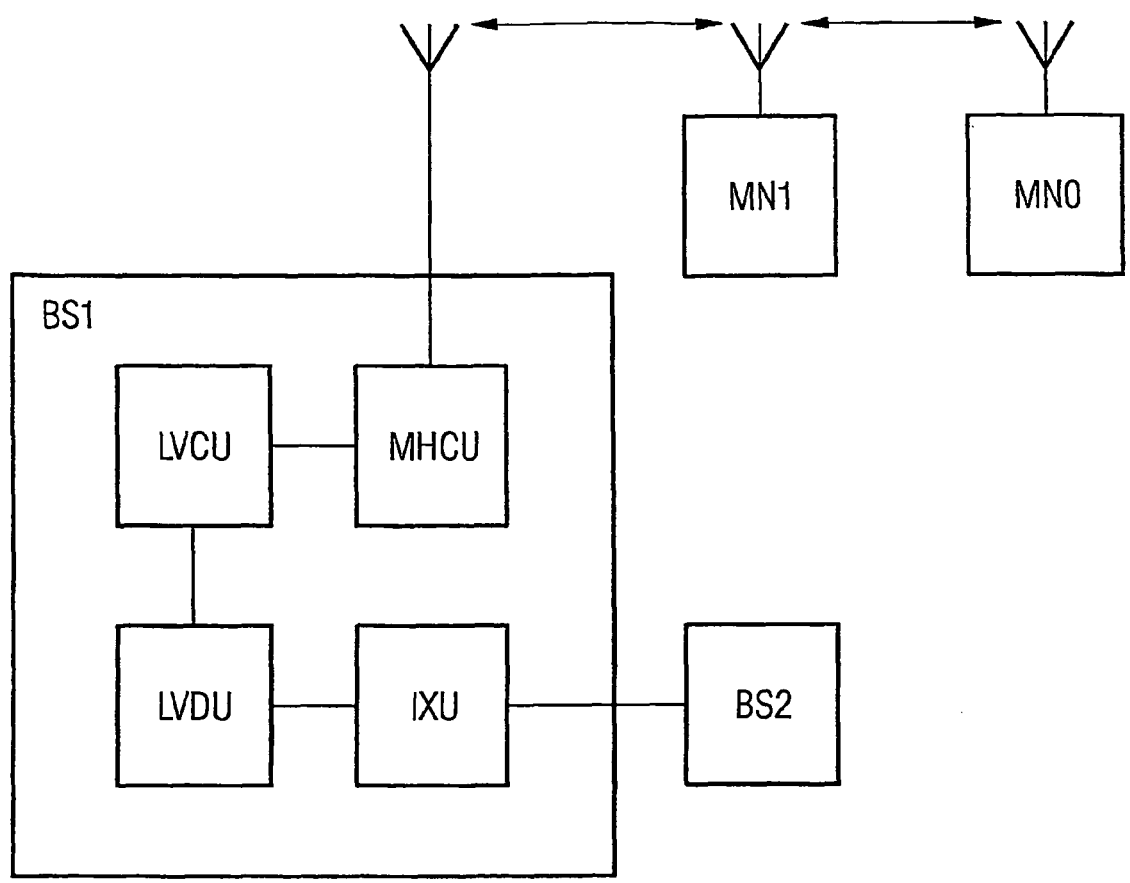
FIG. 10: schematically illustrates the components of a base station according to one embodiment of the invention

FIG. 10 schematically illustrates the components of a base station BS1 for establishing communication links in a radio communication system comprising at least a plurality of base stations BS1, BS2 and user terminals MN0, MN1. The user terminals MN0, MN1 are implemented as multihop capable ad hoc nodes. The user terminal MN0 attempts to establish an ad hoc communication link to the base station BS1 via the user terminal MN1.

The base station BS1 has a limit value definition unit LVDU for defining the hop radius for multihop communication links. Said LVDU is connected at data link level to a limit value comparison unit LVCU for comparing the defined hop radius with current values for the hop length of the communication link currently in question. Said LVCU is in turn connected at data link level to a multihop communication unit MHCU for establishing further multihop communication links depending on the result of the comparison. Finally, at least the LVDU is connected at data link level to an information exchange unit IXU for exchanging hop radius information between base station BS1 and one or more adjacent base stations BS2 of the radio communication system.

Analogously to FIG. 1, FIG. 11 shows a structure for implementing HMIPv6 within the framework of the method, wherein instead of the gateway foreign agent GFA and the regional foreign agents RFA only mobility anchor points MAP are provided which can basically be disposed in any hierarchical levels. The base stations BS1 to BS4 are used in this case as access routers AR. An IP infrastructure of this kind is scalable as required, i.e. basically any number of MAPs can be provided in any hierarchical arrangement in order to provide a desired network coverage or more precisely a desired number of network accesses. The network hierarchy can also be implemented differently in different branches of the IP infrastructure, as schematically illustrated in FIG. 11 for the left- and right-hand branch of the IP infrastructure. This shows that for a user terminal MN1 a handover, for example, from the base station BS3 to the base station BS4 can generally be handled faster, as only local MAPs need to be involved at signaling level in the handover and not a central device such as an RFA or GFA.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide* v. *DIRECTV,* 358 F3d 870, 69 USPQ2d 1865 (Fed. Cir. 2004).

The invention claimed is:

1. A method for controlling whether to establish multi-hop communication links in a radio communication system comprising a plurality of base stations and a plurality of user terminals, at least some of which are implemented as multi-hop-capable ad hoc nodes, comprising:
    establishing a limit value for each base station for multi-hop communication links between the base station and user terminals;
    comparing the limit value with a corresponding current value for multi-hop communication links, the limit value being compared at the base station;
    determining at the base station whether to establish a new multi-hop communication link between the base station and a user terminal, based on whether the limit value is exceeded by the current value;
    establishing the new multi-hop communication link between the base station and the user terminal only if the limit value is not exceeded by the current value; and
    exchanging information concerning limit values between base stations of the radio communication system.

2. The method as claimed in claim 1, wherein each limit value relates to a maximum number of hops allowed for the new multi-hop communication link or a maximum number of multi-hop communication connections that will be handled by the base station.

3. The method as claimed in claim 1,
    wherein each limit value is set individually for the base station.

4. The method as claimed in claim 1, wherein
    each base station defines a cell,
    for at least one of the base stations, cell parameters are analyzed by the base station to produce a result, and
    each base station sets its respective limit value based on the respective result.

5. The method as claimed in claim 1,
    wherein the information concerning limit values is exchanged based at least in part on an IPv6 protocol.

6. The method as claimed in claim 5,
    wherein the information concerning limit values is exchanged based at least in part on an HMIPv6 protocol.

7. The method as claimed in claim 1,
    wherein the limit value of each base station is adjusted based on limit values of adjacent base stations.

8. The method as claimed in claim 1,
    wherein the limit values are defined based on ad hoc protocol data.

9. A device for controlling whether to establish multi-hop communication links to/from user terminals in a radio communication system, at least some of the user terminals being implemented as multi-hop capable ad hoc nodes, comprising:
    a unit for defining a limit value for multi-hop communication links between a base station and user terminals;
    a unit provided in the base station for comparing the limit value with a current value for multi-hop communication links and producing a result;
    a unit provided in the base station for determining whether to set up a further multi-hop communication link between the base station and a user terminal, based on the result; and
    a unit provided in the base station for exchanging limit value information with other devices of the radio communication system.

10. The device as claimed in claim 9,
    wherein the unit for exchanging limit value information operates based on an IPv6 protocol.

11. The device as claimed in claim 9,
    wherein the unit for exchanging limit value information operates based on an HMIPv6 protocol.

12. A non-transitory computer readable medium storing a computer program for causing a computer to execute a method for controlling whether to establish multi-hop communication links in a radio communication system having ad hoc network capability, the computer program comprising:
- a first program routine which calculates and defines a limit for value for multi-hop communication links between a base station and user terminals;
- a second program routine for determining a current value for multi-hop communication links;
- a third program routine executed in the base station for determining whether to establish a new multi-hop communication link from the base station to a user terminal based on whether the limit value is exceeded by the current value;
- a fourth program routine which activates a device for setting up a multi-hop communication link to the user terminal only if the limit value is not exceeded by the current value; and
- a fifth program routine to exchange the limit value with another base station.

13. A method for controlling whether to establish multi-hop communication links in a radio communication system comprising a plurality of base stations and a plurality of user terminals, at least some of which are implemented as multi-hop-capable ad hoc nodes, comprising:

- establishing a limit value for each base station for multi-hop communication links between the base station and user terminals;
- comparing the limit value with a proposed value that will result if a proposed multi-hop communication link is established, the limit value being compared at the base station;
- determining at the base station whether to establish the proposed multi-hop communication link as a new multi-hop communication link from the base station to a user terminal, based on whether the limit value is exceeded by the proposed value;
- establishing the new multi-hop communication link from the base station to the user terminal only if the limit value is not exceeded by the proposed value;
- exchanging information concerning limit values between base stations of the radio communication system; and
- independently varying the limit values between the base stations to adjust each base station's coverage area and optimize network utilization.

14. The method as claimed in claim 13, wherein
each base station is associated with a cell,
increasing the limit value increases a size of the cell, and
decreasing the limit value decreases the size of the cell.

* * * * *